(12) United States Patent
Zoldi et al.

(10) Patent No.: US 12,443,843 B2
(45) Date of Patent: Oct. 14, 2025

(54) MACHINE LEARNING UNCERTAINTY QUANTIFICATION AND MODIFICATION

(71) Applicant: FAIR ISAAC CORPORATION, Roseville, MN (US)

(72) Inventors: Scott Michael Zoldi, San Diego, CA (US); Jeremy Mamer Schmitt, Encinitas, CA (US); Maria Edna Derderian, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 947 days.

(21) Appl. No.: 17/473,250

(22) Filed: Sep. 13, 2021

(65) Prior Publication Data
US 2023/0080851 A1 Mar. 16, 2023

(51) Int. Cl.
*G06N 3/08* (2023.01)
*G06F 17/18* (2006.01)
*G06N 3/045* (2023.01)
*G06N 20/20* (2019.01)

(52) U.S. Cl.
CPC ............ *G06N 3/08* (2013.01); *G06F 17/18* (2013.01); *G06N 3/045* (2023.01); *G06N 20/20* (2019.01)

(58) Field of Classification Search
CPC ........ G06F 17/18; G06N 20/20; G06N 3/045; G06N 3/08
See application file for complete search history.

(56) References Cited

U.S. PATENT DOCUMENTS 6,195,624 B1 * 2/2001 Woodman .............. G21C 17/00
706/920

OTHER PUBLICATIONS

Lee, Keuntaek, Kamil Saigol, and Evangelos A. Theodorou. "Early failure detection of deep end-to-end control policy by reinforcement learning." 2019 International Conference on Robotics and Automation (ICRA). IEEE, 2019. (Year: 2019).*
Lakshminarayanan, Balaji, Alexander Pritzel, and Charles Blundell. "Simple and scalable predictive uncertainty estimation using deep ensembles." Advances in neural information processing systems 30 (2017) (Year: 2017).*

* cited by examiner

*Primary Examiner* — Schyler S Sanks
(74) *Attorney, Agent, or Firm* — Mintz, Levin, Cohn, Ferris, Glovsky and Popeo, P.C.; F. Jason Far-hadian, Esq.

(57) ABSTRACT

Computer-implemented machines, systems and methods for providing insights about uncertainty of a machine learning model. A method includes determining an uncertainty value associated with a first machine learning model output of a first machine learning model. The method further includes generating a confidence interval for the first machine learning model output associated with an input. The method further includes switching, responsive to the uncertainty value satisfying a threshold, from the first machine learning model to a second machine learning model, the second machine learning model generating a second machine learning model output. The method further includes generating the second machine learning model. The method further includes providing, responsive to the switching, the machine learning output, the uncertainty value, the confidence interval, and the second machine learning output to a user interface.

16 Claims, 15 Drawing Sheets

|  | P(Fraud \| Input) |
|---|---|
| SCORE 1 | 0.698 |
| SCORE 2 | 0.794 |
| SCORE 3 | 0.881 |
| SCORE 4 | 0.686 |
| SCORE 5 | 0.587 |
| SCORE 6 | 0.886 |
| SCORE 7 | 0.867 |
| SCORE 8 | 0.509 |
| SCORE 9 | 0.731 |
| SCORE 10 | 0.793 |
| SCORE 11 | 0.786 |

FIG. 4A

|  | Uncertainty Quantiles | | | |
|---|---|---|---|---|
|  | Base | | Stepdown | |
| Quantile | EU | US | EU | US |
| Median | 1.50E-07 | 7.30E-06 | 1.02E-07 | 1.84E-07 |
| 95th | 6.30E-04 | 4.50E-03 | 1.10E-04 | 2.70E-04 |

| Sample Predictive Variance Quantiles | | |
|---|---|---|
| Quantile | Exploded Network | Reduced Exploded Network |
| Median | 1.10E-06 | 2.10E-07 |
| 95th | 8.10E-04 | 9.40E-05 |
| 99th | 3.00E-03 | 2.40E-04 |

MACHINE LEARNING UNCERTAINTY QUANTIFICATION AND MODIFICATION

TECHNICAL FIELD

The disclosed subject matter generally relates to artificial intelligence technology and, more particularly, to technological improvements that facilitate quantification of machine learning model uncertainty.

BACKGROUND

Artificial intelligence (AI) refers to introducing human-like logic or intuition in a computing system. AI is commonly used to perform tasks that require intelligence or domain expertise which help solve problems that cannot be defined by a predetermined set of rules or fixed logic. AI systems are thus typically deployed to analyze and classify data and make predictions relying on data and dynamic calculations that are far too voluminous and complex for a human to possibly digest and perform, either mentally or by way of pen and paper.

Machine learning (ML) is a subset of AI that utilizes self-learning algorithms to implement intelligent behavior into AI systems and generally refers to the practice of teaching a computing system to learn, including the ability to dynamically adapt and analyze large volumes of data to identify patterns, without requiring explicit programming. Unconventionally, ML models can provide predictive advantages to enhance the functionality of a system or a computing model when complex relationships or constraints are at play.

Disadvantageously, without a good understanding of the influencers, relationships or constraints that define a ML model, the ML model's non-routine functionality and behavior may be prone to errors or undesirable results and biases that may not meet certain principles or standards. For example, a lack of complete understanding of a model's behavior may lead to scenarios involving the encoding of unintentional or unwanted features that inappropriately or unknowingly skew the results generated by the model.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, computer-implemented machines, systems and methods are disclosed for providing insights about misalignment in latent space of a ML model.

In one aspect a method is provided. The method includes determining, by one or more programmable processors, an uncertainty value associated with a first machine learning model output of a first machine learning model. The method further includes generating, by the one or more programmable processors, a confidence interval for the first machine learning model output associated with an input. The method further includes switching, by the one or more programmable processors and responsive to the uncertainty value satisfying a threshold, from the first machine learning model to a second machine learning model, the second machine learning model generating a second machine learning model output. The method further includes generating, by the one or more programmable processors, the second machine learning model. The method further includes providing, by the one or more programmable processors and responsive to the changing, the machine learning output, the uncertainty value, the confidence interval, and the second machine learning output to a user interface.

In some variations of the method, the uncertainty value is based on an estimate of model predictive variance for a first machine learning model based on an ensemble of architecturally same machine learning models based on a sampling of models based on different training parameters. The predictive variance may be defined as $Var(y|x) = \int [p(y|x) - p(y|x, m)]^2 \, p(m|D) dm$, which embodies a possible variation in scores for a given input x over the possible choices of the first machine learning model. The predictive variance may be based on variance of a finite sum of possible choices of the first machine learning model from a posterior distribution. The confidence interval may be based on a parametric statistical method or a non-parametric statistical method. The confidence interval may be represented as, $[\max(\bar{x} - f(c)s, 0), \min(\bar{x} + f(c)s, 1)]$, where c, is first a desired confidence level, $\bar{x}$ represents scores' sample mean s, represents the sample standard deviation, and $f(c)$ represents an appropriate parametric multiplier. A statistical measure of variation in weight-of-evidence is the ratio of weight of evidence first model over finite normalized sum of possible choices of the first machine learning model from a posterior distribution and associated weight of evidences of these finite set of models. The second machine learning model may include a stepdown model. The stepdown model may have a lower predictive variance than the first machine learning model. Generating the second machine learning model may be based on the first machine learning model. Generating the second machine learning model may include constructing hidden layers of the second machine learning model where hidden nodes of the hidden layers are a sparse sub-network of hidden nodes approximating the first machine learning model. Generating the second machine learning model may further include generating perturbed variations of the sparse networks of high variance hidden nodes. Generating the second machine learning model may further include removing or prohibiting feature interactions contributing the high variance hidden nodes. Generating the second machine learning model may further include iterating and training the second machine learning model based on removed and prohibited feature interactions to minimize model variance of the second machine learning model. Providing the machine learning output, the uncertainty value, the confidence interval, and the second machine learning output comprises transmitting the machine learning output, the uncertainty value, the confidence interval, and the second machine learning output to a display of the user interface.

In some embodiments, a system is provided. The system includes at least one programmable processor and a non-transitory machine-readable medium storing instructions that, when executed by the at least one programmable processor, cause the at least one programmable processor to perform operations. The operations include determining an uncertainty value associated with a first machine learning model output of a first machine learning model. The operations further include generating a confidence interval for the first machine learning model output associated with an input. The operations further include switching, responsive to the uncertainty value satisfying a threshold, from the first machine learning model to a second machine learning model, the second machine learning model generating a second machine learning model output. The operations further include generating the second machine learning model. The operations further include providing, responsive to the switching, the machine learning output, the uncertainty value, the confidence interval, and the second machine learning output to a user interface.

In some variations of the system, the uncertainty value is based on an estimate of model predictive variance for the first machine learning model. The predictive variance may be defined as $Var(y|x)=\int [p(y|x)-p(y|x, m)]^2 \, p(m|D)dm$, which embodies a possible variation in scores for a given input x over the possible choices of the first machine learning model. The predictive variance may be based on variance of a finite sum of possible choices of the first machine learning model from a posterior distribution. The confidence interval may be based on a parametric statistical method or a non-parametric statistical method. The confidence interval may be represented as, $[\max(\bar{x}-f(c)s,0), \min(\bar{x}+f(c)s,1)]$, where c, is first a desired confidence level, $\bar{x}$ represents scores' sample mean s, represents the sample standard deviation, and $f(c)$ represents an appropriate parametric multiplier. The second machine learning model may include a stepdown model. The stepdown model may have a lower predictive variance than the first machine learning model. Generating the second machine learning model may include constructing hidden layers of the second machine learning model where hidden nodes of the hidden layers are a sparse sub-network of hidden nodes approximating the first machine learning model. Generating the second machine learning model may further include generating perturbed variations of the sparse networks of high variance hidden nodes. Generating the second machine learning model may further include removing or prohibiting feature interactions contributing the high variance hidden nodes. Generating the second machine learning model may further include iterating and training the second machine learning model based on removed or prohibited feature interactions to minimize model variance of the second machine learning model.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

FIG. 4A is a table of example model scores for a transaction produced by an ensemble of sampled models, in accordance with one or more implementations.

FIG. 4B is a table of example uncertainty value quantiles for a base model and a stepdown model with respect to European Union (EU) and United States (US) sample data, in accordance with one or more implementations.

FIG. 7 is a graph diagram illustrating a correlation between respective hidden nodes in two different sparse exploded networks with the same topology, in accordance with one or more implementations.

Where practical, the same or similar reference numbers denote the same or similar or equivalent structures, features, aspects, or elements, in accordance with one or more embodiments.

DETAILED DESCRIPTION

Figure 1:
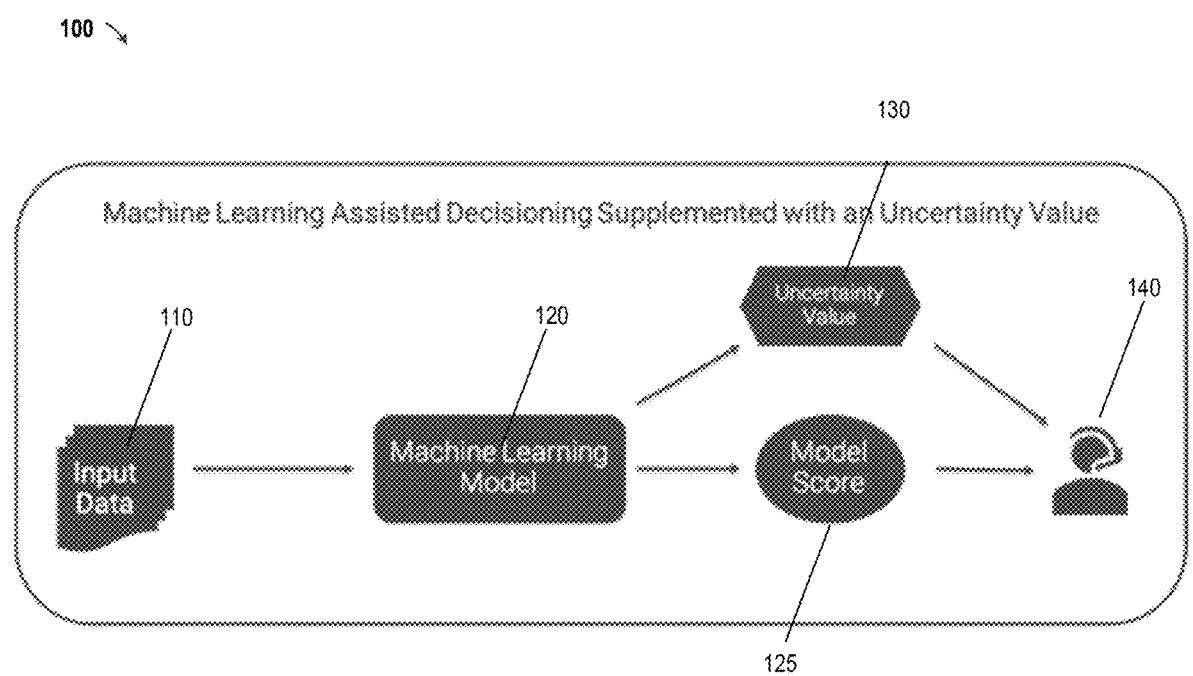
FIG. 1 is a diagram of an example machine learning assisted decisioning supplemented with an uncertainty value, in accordance with one or more implementations.

In the following, numerous specific details are set forth to provide a thorough description of various embodiments.

Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Machine learning is a powerful data-driven tool to support real-time decision making, but machine learning models will generally always return an estimate even when the underlying model is not appropriate with respect to the values of inputs. Uncertainty quantification refers to the process of obtaining a measure of confidence in the model's ability to make a reliable estimate given a particular input value or set of input values. Uncertainty measures may provide a practitioner evidence of the model's confidence in a given result, high uncertainty measures may indicate that the model result should not be used in subsequent decisions. In many applications of machine learning the outcome of a decision can have significant asymmetric real-world consequences. For example, for autonomous vehicles, a machine learning outcome may determine that there is no obstacle on the road. However, if that outcome has a high uncertainty measurement, it may be prudent to slow down or stop a vehicle until the ML model makes a more confident determination. Additionally, machine learning outcomes may have an impact on personal and/or national security. For example, biometrics (e.g., facial recognition) may be used to authorize the user for a personal device or military operation (e.g., target for a drone strike). In such a circumstance, machine learning determinations (e.g., identifying a user or target) may call for a high level of certainty for authorization.

Alternate approaches such as a stepdown model or manual review can be the most responsible action to take versus blindly automating a decision on an input where the model has high uncertainty. While machine learning models can be a valuable tool for decision makers, a complimentary measure of uncertainty can be of equal or greater value. Knowledge of high uncertainty can enable the decision-maker to pursue a course of action that mitigates or bounds the potential down-side of a particular decision and is a fundamental part of acting responsibly with AI.

While there may be many notions of uncertainty that each have their own strengths and weaknesses, two particular types of uncertainty with respect to modelling are described herein. Aleatoric uncertainty, also commonly referred to as statistical uncertainty or data uncertainty, relates to the inherent randomness of the phenomenon being modelled. This type of uncertainty does not improve with gathering more data or choosing a different model, as the uncertainty is fundamental to that which is being modelled. This type of uncertainty relates to outcomes that can be either too complex to estimate, inherently not predictable, non-deterministic, or the process is unobservable. Epistemic uncertainty, also commonly referred to as model uncertainty, relates to the uncertainty derived from the underlying difference between the model and the thing it is modelling. Additional data and/or more appropriate model choices can reduce epistemic uncertainty, and it is this type of uncertainty that is relevant to our invention. Epistemic uncertainty may be referred to hereafter as uncertainty.

The output of a machine learning model is often a point estimate of some form of predicted value, probability, or class membership. Uncertainty measures provide a notion of variability in the point estimates that the model produces for a given input, and it is important to recognize that the model uncertainty varies based on the values of inputs, e.g. different inputs can have the same point estimate of probability but different uncertainties. Uncertainty measures can augment the point estimate to enable visibility into lack of confidence in sets of point estimates where alternate approaches may be followed to derive a higher confidence or more responsible point estimate.

High uncertainty values can imply that the underlying machine learning model is not an appropriately reliable tool for the respective input, and the decision-maker may need to use a stepdown model to receive a more robust and responsible point estimate. A stepdown model can take many forms such as a model that uses different inputs or a different model architecture. Uncertainty estimates can provide a signal that a stepdown model is not only necessary, but also a responsible choice. Depending on the input values, and the corresponding uncertainty, a mix of original model and stepdown models may be used to maintain acceptable behavior under varying levels of uncertainty.

Feedforward artificial neural networks are a type of machine learning model that may be in a form known as a multi-layer perceptron (MLP). A MLP model consists of a hierarchy of sets of activation functions that are composed to take as input an affine function of the outputs of the prior sets of activation functions. Each set of activation functions is known as a layer, where each activation in the layer is referred to as a neuron or node. Activation functions are generally smooth or piecewise differentiable monotonically increasing functions. The affine function between two layers is defined by a set of parameters that specify the linear transformation, known as weights, and a set of parameters that specify the translation known as a bias. The initial layer is known as the input layer and the final layer is known as the output layer. All layers in between the input and output layer are referred to as hidden layers, and their nodes are referred to as hidden nodes or often as latent features. A MLP with n-layers is then defined as the function $f$, $$L_1(x) := x$$

$$L_i(x) := \sigma_i(W_i x + b_i)$$

$$f(x) := (L_n \circ L_{n-1} \circ \ldots \circ L_1)(x),$$

where $\circ$ denotes function composition, i ranges from 2 to n, $W_i$ are the weights of layer i, $b_i$ is the bias term, and $\sigma_i$ is the corresponding activation function.

The output of a machine learning model may be the conditional probability of the input coming from a particular class, and may be referred to as a score. A machine learning model, for which uncertainty is being estimated, may be referred to as the base model.

FIG. 1 is a diagram 100 of an example machine learning (ML) assisted decisioning supplemented with an uncertainty value, in accordance with one or more implementations. As shown, the diagram 100 includes an input dataset 110, a ML model 120, an uncertainty value 130, a model score 125, and a client device 140. The ML model 120 may be implemented on a computing system, the computing system may be a general-purpose computer, for example, or any other suitable computing or processing platform. The computing system may include learning software (e.g., a machine learning or self-learning software) that receives input dataset 110.

In accordance with one or more embodiments, machine learning software may process the dataset 110 associated with certain features (e.g., individual measurable properties or characteristics of a phenomenon or the dataset 110 being observed). In some aspects, the uncertainty value 130 may be an estimate of the uncertainty in the machine learning model 120 for a given input. The uncertainty value 130 may be based upon estimating a predictive variance of a base model (e.g., ML model 120) for a given input, which may be estimated by sampling from the posterior predictive distribution. Letting M be the model space, then training a model can be seen as a search problem to find the optimal model or parameter values, $m^* \in M$, that approximately or exactly extremize a function, F, of the training data, D, and a given model, $m^* \approx \arg \text{ext}_{m \in M} F(m, D)$. In the case of binary classification, F often represents the negative log likelihood function and $m^*$ is the value of parameters that exactly or approximately minimize this function with respect to the training data. The training data is often a limiting factor, as additional data covering possible inputs that aren't in the training data can offer additional information to better specify $m^*$. This implies that there may be future data inputs seen in production for which $m^*$ is not the best value of model or even that M is not the best space of models in which to find the optimal model, and this is precisely what an uncertainty estimate can indicate. Additionally, there can be particular data points in the training set for which the model exhibits high uncertainty, which could be due to the training set's lack of coverage in this neighborhood of input feature space or some other noisy or missing information. With this in mind we now define the posterior predictive distribution, $p(y \in C|x) = \int p(y \in C|x, m) p(m|D) dm$, where x is a given input, $y \in C$ indicates that the class label for input x belongs to the minority class, $p(y \in C|x, m)$ is the conditional probability of $y \in C$, and $p(m|D)$ is the posterior distribution over models. More simply put, this is a weighted average over models that is weighted by the probability of the model given the training data. The predictive variance can then be defined as, $\text{Var}(y|x) = \int [p(y|x) - p(y|x, m)]^2 p(m|D) dm$, which embodies the possible variation in scores for a given input x over the possible choices of model. Assuming that the model space, defined by M, is sufficiently expressive to well approximate the true model, then a reasonable approximation of uncertainty for a given input x can be attained by approximating the predictive variance.

In some aspects, the uncertainty value 130 is based on an estimate of the predictive variance. Estimating the predictive variance may be based on sampling from the posterior distribution, then calculating the resulting sample variance of model outputs. A method of sampling may include using the existing model training process and perturbing it n times to generate n new models. Training a model can be viewed as sampling from the posterior distribution over model parameters.

The perturbation can come in many possible ways. For example, if the training process involves a stochastic element, such as random initialization or random shuffling of the data for stochastic gradient descent, then simply changing the random seed can result in a different set of model parameters, and therefore a different sample from the posterior distribution. Another choice of perturbation is to train a model on a random sub-sample of the training data, i.e., bootstrapping. Also, one could perturb the model hyperparameters leading to a different model architecture within the model space. Either of these methods allows for task-parallel efficiencies to be had by horizontal scaling of compute resources resulting in near constant compute time. With the n perturbed trained models plus the original trained model, the predictive variance can now be estimated for a given input by producing n+1 scores that are used to calculate the sample predictive variance yielding an uncertainty estimate.

In production, the model can then return not only a score, but also an uncertainty value (e.g., uncertainty value 130) associated with the input (e.g., input data 110) that can provide additional insight for the decision process (see FIG. 1).

The embodiments described herein include estimating ML model uncertainty, returning a confidence interval for the ML model output, when the uncertainty estimate is high, implementing a process to stepdown from the base model to a more robust stepdown model, and implementing an iterative training method to make more robust the underlying base model or create a more stable stepdown model by removing feature interactions associated with driving higher model predictive variance.

In some aspects, machine learning models have begun to proliferate across many different industries, and with this comes an urgent need for more comprehensive model governance to ensure the appropriate and ethical use of machine learning models. A potentially valuable piece of information of a ML model's output score may come in the form of a confidence interval for the particular input's possible ML model scores. The confidence interval may provide the decision process with a concrete realization of plausible score values for the respective model input.

Using the method outlined above to produce n+1 scores may allow for efficient calculation of such a confidence interval for the given input. The confidence interval can be constructed based on a parametric statistical method or a non-parametric statistical method. For the parametric approach, first a desired confidence level, c, may be specified, then using the scores' sample mean, $\bar{x}$, sample standard deviation, s, and the appropriate parametric multiplier, $f(c)$, the confidence interval is of the form, $[\max(\bar{x}-f(c)s,0), \min(\bar{x}+f(c)s,1)]$, which may remain a subset of [0,1] since our score is a probability. For the non-parametric approach, the sample scores may be used to estimate specified quantiles or extrema, $q_l$ and $q_u$, which are then used to provide an interval that represents a range of plausible values, $[q_l, q_u]$. For example, if the upper and lower quartiles are used then the resulting interval represents the inter-quartile range of plausible score values. Utilizing this calculation allows the model to return both a score and a confidence interval (see FIG. 2), providing decision makers with potentially valuable contextual information to further align with ML model governance standards and responsible decisioning.

Figure 2:
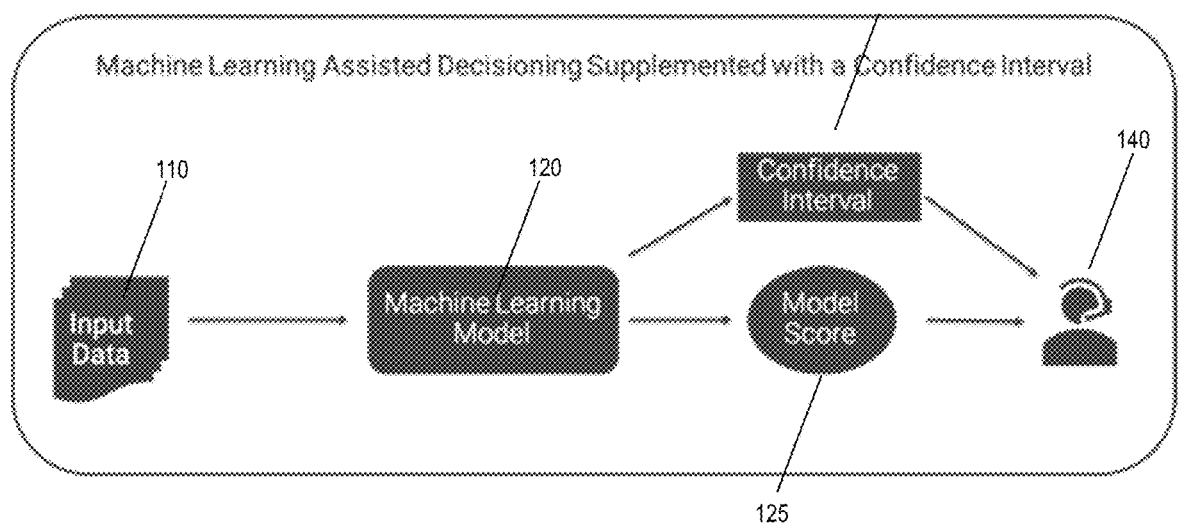
FIG. 2 is a diagram of an example machine learning assisted decisioning supplemented with a confidence interval, in accordance with one or more implementations.

FIG. 2 is a diagram 200 of an example machine learning assisted decisioning supplemented with a confidence interval, in accordance with one or more implementations. As shown, the diagram 200 includes the input dataset 110, the ML model 120, a confidence interval 230, the model score 125, and the client device 140.

As noted above, the confidence interval 230 may be generated based on a parametric statistical method or a non-parametric statistical method.

When the uncertainty estimate (e.g., uncertainty value 130) is large for a particular input, then the underlying base model (e.g., ML model 120) may no longer be viable or the responsible model to use to make decisions in this case. In this circumstance, a stepdown model can be used to ensure robust model performance and to comply with any existing regulatory constraints for the particular domain of operation. The stepdown model can take many forms including an existing model that was trained upon a broader set of data, a model based upon distribution invariant inputs such as dynamic quantile estimation, or a model with reduced capacity (simpler model architecture) that relies upon more reliable and persistent predictive patterns.

Figure 3:
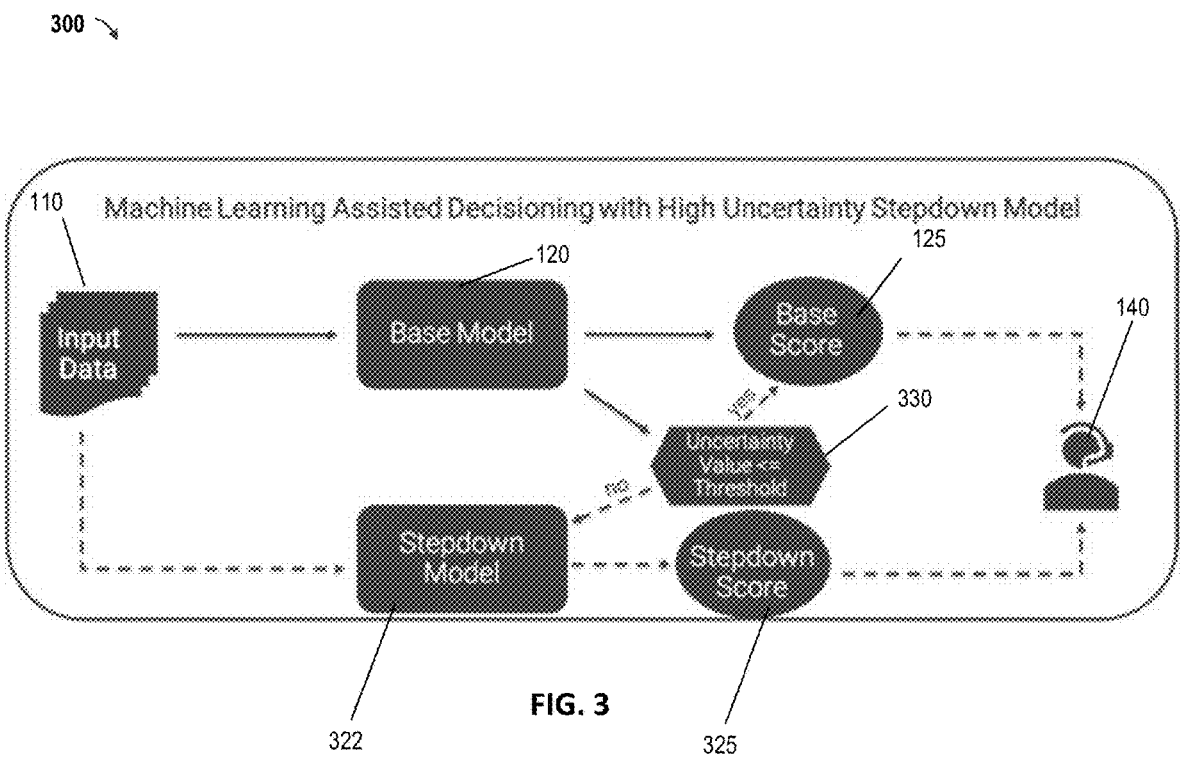
FIG. 3 is a diagram of an example machine learning assisted decisioning with a high uncertainty stepdown model, in accordance with one or more implementations.

FIG. 3 is a diagram 300 of an example machine learning assisted decisioning with a high uncertainty stepdown model 322, in accordance with one or more implementations. As shown, the diagram 300 includes the input data 110, a base model 120, a base model score 125, the client device 140, and uncertainty value comparison 330, a stepdown ML model 322, the stepdown ML model score 325. At the uncertainty value comparison 330, if the uncertainty value (e.g., uncertainty value 130) is less than or equal to a threshold value, then a system may use the base score 125. If the uncertainty value is greater than the threshold, then the system may use the stepdown model 322 and the resulting stepdown model score 325.

In some variations, a defining aspect of a stepdown model (e.g., stepdown model 322) may be that it should be more trusted to perform in unknown out-of-distribution environments or low coverage regimes as compared to the base model (e.g., base model 120). In production, a threshold (e.g., used at comparison 330) can be specified for which any input with uncertainty value above the threshold results in the stepdown model score (e.g., stepdown model score 325) being returned in place of the base model score 125 (see FIG. 3).

In the case of classification, the threshold can be based upon mapping the uncertainty estimate (e.g., uncertainty value 130) into a Weight-of-Evidence (WoE) differential that may more directly connect to the effective range in strength of evidence of class membership that the model could reasonably output. WoE may be defined in terms of a discrete independent variable, Y, which may be the model score, and a dependent variable, X, that represents a discrete event or class membership. WOE may then be given by, $$WoE(x) = \ln\frac{P(X=x|Y=y)}{P(X=x|Y\mathrel{!}=y)},$$

where ln denotes the natural logarithm. In some aspects, if the variables are continuous, they can be binned into a discrete set of values. The WoE differential may be constructed as follows. First, during model development a look-up table may be constructed to map model outputs to WoE values based upon the training data. Then in production as an input arrives, the model may return both a score (e.g., score 125) and an uncertainty estimate (e.g., uncertainty value 130), which is then used to create a confidence interval (e.g., confidence interval 230) for the model score. Using the WoE look-up table, the end points of the confidence interval may be mapped to their corresponding WoE values. Finally, the difference in the WoE values may be divided by the maximum possible difference in WoE values to yield the WoE differential value. Denoting the endpoints of the original confidence interval as $s_l$, $s_u$, and the corresponding WoE values as $woe_l$, $woe_u$ the WoE differential is given by, 100

$$\left(\frac{woe_u - woe_l}{woe_{max} - woe_{min}}\right)\%,$$

where $woe_{max}$ and $woe_{min}$ are the maximum and minimum WoE values based on the training data scores. The WoE differential represents the variability of possible WoE values associated with the model output, and it is represented in the form of a percentage indicating the possible range in WoE values over the maximum possible range in WoE values. In other words, the WoE differential directly represents the variability in the strength of evidence provided by the model output. Practitioners can then determine the acceptable threshold of variability in the strength of evidence and use this threshold to determine when to use a stepdown model in place of the base model. With both a stepdown model and an uncertainty value at hand, the decision process can prevent relying upon the base model when it is inappropriate for particular inputs, and instead the stepdown model can step in to provide a more robust output that aligns with the goals and regulations of the particular decisioning domain (e.g., autonomous driving, biometric security, etc.).

In some aspects, a method of constructing a ML model with lower predictive variance is described. Reducing a model's epistemic uncertainty may not always possible without bringing in additional information. However, it may be possible to reduce the predictive variance of a model. Machine learning models may exhibit a bias-variance tradeoff. While simple linear models generally have low variance, they exhibit high bias due to the limited size of the hypothesis space. Conversely more expressive models, such as neural networks, tend to have low bias, but high variance. What this implies is that high variance models may be underspecified in terms of some of the parameters and exhibit near random behavior on certain subsets of data.

Underspecification can lead to problematic patterns being unknowingly stored in the model itself, and may be a persistent issue with larger neural network models that has plagued many of their models in production. Therefore, it may be desirable to minimize underspecification and any of the possibly detrimental patterns that a machine learning model may unintentionally learn during training. Underspecification, overfitting, and underfitting are related but distinct notions, and to further clarify their differences see FIG. 5.

Figure 5:
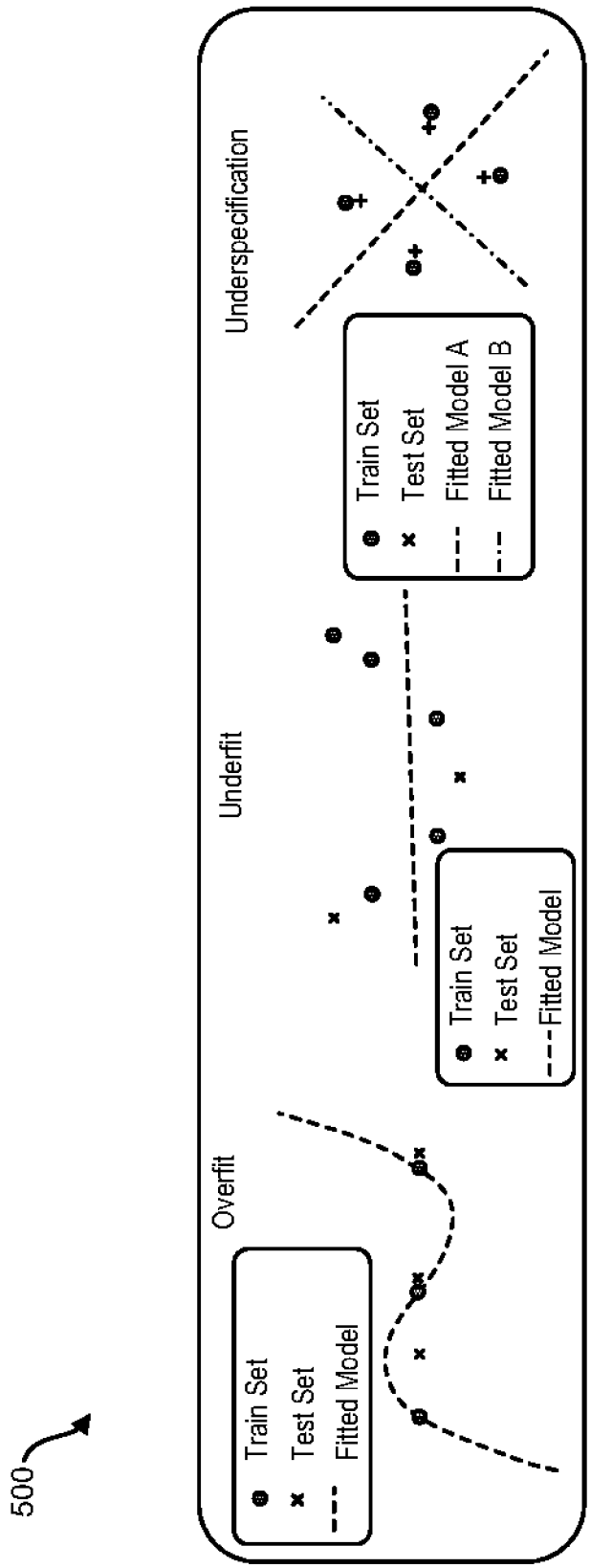
FIG. 5 is a diagram of sample graphs illustrating examples of over-fitting, under-fitting, and under-specification, in accordance with one or more implementations.

FIG. 5 is a diagram of sample graphs illustrating examples of over-fitting, under-fitting, and under-specification, in accordance with one or more implementations. As shown, the first plot (e.g., on the left-hand side) shows a simple case of overfitting in which a cubic polynomial is fit to data that is inherently linear. The next plot (e.g., middle graph) shows a simple case of underfitting in which a linear model is fit to data following a quadratic curve. The last plot (e.g., right-hand side) in the figure shows a simple case of underspecification where the data allows for more than one optimal linear solution. The underspecification example also demonstrates how there may be greater variability in the possible parameters of an optimal linear solution, which will lead to higher levels of predictive variability among the candidate models. These simple, low-dimensional examples may be useful to gain basic intuition for these terms, but as complexity, randomness, and dimensionality increase the implications of these concepts can be magnified.

While both the risk of overfitting and underfitting are generally examined during model development, underspecification is less often addressed. Additionally, when machine learning models are placed into production, it may often be the case that the underlying production data distribution has some differences from the data used to develop the model, and even small differences can have a dramatic impact for some cases of model underspecification. What may have been a negligible difference in models during development can become a dramatic difference in production with serious real-world consequences, which makes the task of reducing underspecification all the more urgent.

With this in mind, described herein is a method to reduce predictive variance in a neural network based on the estimate of predictive variance that we outlined above. The basis of this technique is to identify problematic feature interactions that are underspecified and driving higher predictive variance of the model, then to eliminate or prohibit these interactions.

The steps are as follows. First, if the neural network defining the base model consists of densely connected latent features in a form not amenable to interpretation, then a process of sparsification is needed to yield a network structure that facilitates easier interrogation of lower-order features interactions.

The following sparsification process is done for each node in the first hidden layer and then sequentially for each subsequent hidden layer. A single hidden layer MLP with sparse input-to-hidden connectivity is initialized for each dense hidden node, i.e., a sparse network. Then, using the node activation values from the previous layer as inputs and the respective dense hidden node activation values as the target, the sparse network may be trained to simulate the dense hidden node.

The process defined by the steps above may be referred to as "exploding" the hidden node, and the resulting single hidden layer multi-layer perceptron (MLP) that replaces the original dense hidden node may be referred to as the exploded node. Once each dense hidden node has been exploded the resulting sparsely connected neural network should now have latent features that are far more interpretable than the original neural network. In particular, the hidden nodes in the first hidden layer are now latent features representing the interactions of a small number of input features due to sparse connectivity.

Viewing the neural network as a graph, where each node represents a vertex and each non-zero weight represents an edge between nodes, we will refer to the structure of this graph as the topology of the network. (See FIG. 10) To measure the variability of each latent feature, the same methodology may be used to generate the uncertainty estimate. In particular, enforcing the same topology as specified in the exploded network and using a stochastic optimizer with different random seeds a number of distinct neural networks are trained that all have a common topology, but possibly varying weights and bias values.

For any given input in the training data, a value of a particular latent feature's activation can be obtained for each of the distinct neural networks, and a measure of dispersion, such as the sample variance, can be calculated based on these values. This yields a dispersion value for each of the latent features for a particular input from the training data, and across all the training data this yields an empirical distribution of dispersion for each latent feature. By analyzing these empirical distributions across all latent features, one can now identify latent features exhibiting higher levels of dispersion or variation. The latent features showing elevated levels of variation can be pruned from the graph restricting explicit feature interactions and constraining the training of the neural network, resulting in a new topology and neural network. The pruned neural network can then be fine-tuned by training for a few epochs using either the original targets or replacing them with the output of the original dense neural network for each respective training input.

The result is a new model that will exhibit lower predictive variance at the level of the model output, which may be referred to as a reduced exploded network. Once the reduced exploded network is obtained, the latent features can be further inspected for undesirable interactions as defined by the particular decisioning domain.

In summary, the method outlined here may take an initial base model (e.g., base model 120) and by exploding the nodes and identifying and eliminating interactions with high variation leads to a new model (e.g., stepdown model 322) with lower levels of predictive variance, thereby helping to ease some of the unintended consequences of model underspecification. Even if the underlying base model is not a neural network, using model distillation, it can be transformed into a neural network, where the above methodology can now be applied. Conversely, if the underlying base model is already a sparse, interpretable neural network, then it may not be necessary to explode the hidden nodes and one can immediately begin the task of identifying high variation latent features and eliminating them by prohibiting explicit feature interactions in the network.

A subtlety of the above process is the assumption that a given hidden node in an exploded network trained with a particular random seed would likely be correlated with that same hidden node in an exploded network trained with a different random seed. As evidence consider the following correlation analysis between hidden nodes in a base model and the subsequent exploded network.

Figure 6:
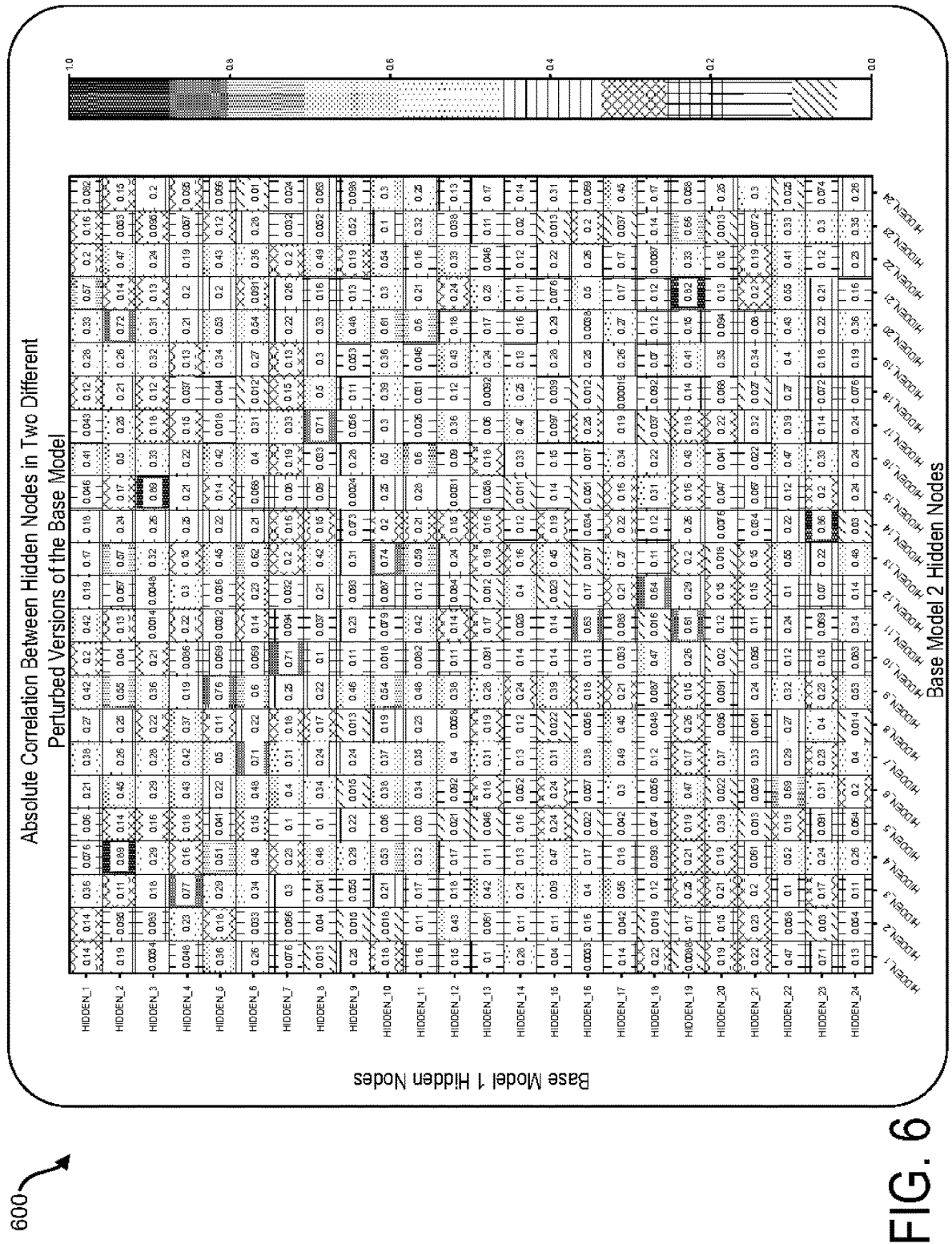
FIG. 6 is a graph diagram illustrating a correlation between hidden nodes of two perturbed versions of a dense base model, in accordance with one or more implementations.

FIG. 6 is a graph diagram illustrating a correlation between hidden nodes of two perturbed versions of a dense base model, in accordance with one or more implementations. FIG. 6 shows the correlation (in absolute value) between all pairs of hidden nodes in the first layers of two versions of the base dense network trained with different random seeds. By examining the diagonal that compares equivalent hidden nodes in the two different networks there is no evidence of a strong relationship between hidden nodes in the two dense networks, and judging by the low occurrence of off-diagonal pairs having high correlation this implies that latent features in one network have no natural correspondence to a latent feature in the other network.

Figure 7:
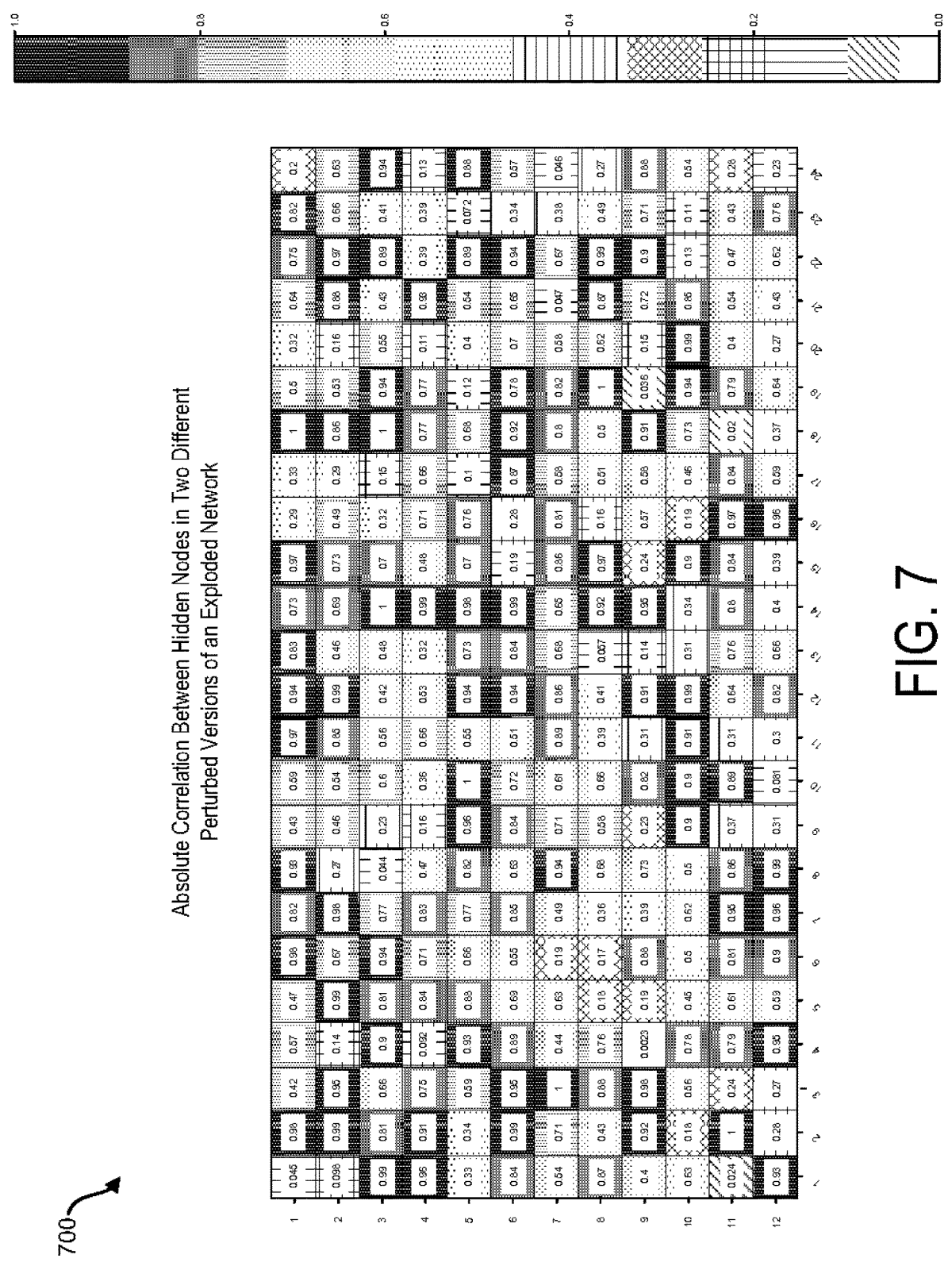

Conversely, FIG. 7 shows the absolute correlation between respective hidden nodes in two different sparse exploded networks with the same topology, and there is in general a strong relationship between the respective hidden nodes in each network. FIG. 7 is a graph diagram 700 illustrating a correlation between respective hidden nodes in two different sparse exploded networks with the same topology, in accordance with one or more implementations.

In the example, respective nodes may have the same three non-zero weights corresponding to particular input features. This relationship can be made even stronger by using the same weight initialization, but still allowing for different random seeds in shuffling the order of mini-batch data presented to the networks during training (see FIG. 8 for the resulting correlations of this approach). In summary, a sparse topology may enable a natural correspondence between the hidden nodes in networks trained with a different random seed, and it is this correspondence that enables the meaningful measurement of hidden node variance across the networks and consequently for us to identify uncertainty factors and relationships to remove and prohibit in more stable models.

Figure 8:
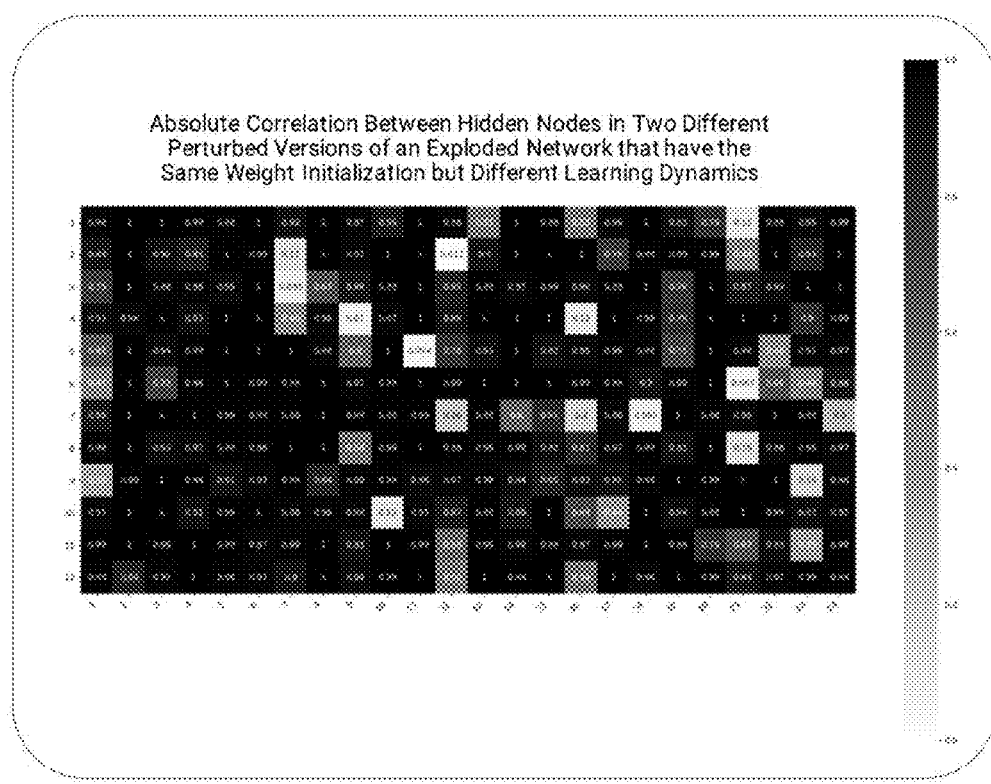
FIG. 8 is a graph diagram illustrating a correlation between respective hidden nodes in the first layer of two different sparse exploded networks that used the same weight initialization, but different random shuffling during stochastic gradient descent, in accordance with one or more implementations.

FIG. 8 is a graph diagram 800 illustrating a correlation between respective hidden nodes in the first layer of two different sparse exploded networks that used the same weight initialization, but different random shuffling during stochastic gradient descent, in accordance with one or more implementations.

A relationship between an uncertainty estimate and the estimate of predictive variance for a model may vary as the respective hypothesis space is expanded or contracted. When the hypothesis space is sufficiently large, an estimate of predictive variance can be an excellent estimate of model uncertainty. However, as the hypothesis space contracts the estimate of predictive variance becomes weaker at capturing all the sources of model uncertainty. The extreme case being a model space consisting of a single model. A resulting estimate of predictive variance would be equal to zero, yet for a given input it could have quite high model uncertainty. As noted above, while the predictive variance can decrease its value as an estimate of model uncertainty, with all else equal a model with lower predictive variance is preferable as this can only help to reduce the number of unintended or noisy patterns that the model has learned and result in models that are more responsible, ethical, and safe.

In an exemplary demonstration, the methods and systems described herein may be applied to the domain of autonomous (e.g., self-driving) vehicles. The machine learning system may involve a feed-forward artificial neural network known as a multi-layer perceptron (MLP), which will output the conditional probability of an object in the vehicle's path given the input. The model training and test data may include tagged objects from a consortium of vehicle institutions (e.g., state DMVs). A base MLP model may be developed based on the vehicle institutions data to facilitate an uncertainty estimation for a given object in a vehicle's path.

Additional MLP models may be trained using a perturbed version of the base model training process. For a given input, each of the additional MLP models produce a score indicating a probability of the presence of the object, which can then be used to produce an uncertainty estimate based on the sample variance of the scores, which approximates the variance of the predictive distribution and may help generate a confidence interval for the output. Both the score and the uncertainty value may be returned by the model to assist in the decision process, and given a higher level of uncertainty, a stepdown model may be appropriate for a particular input variable vector which represents the object.

For example, a white colored vehicle on a sunny day may or may not be recognized as an object by the base model and the base model may return an output (e.g., object detection) determination with a high uncertainty. Based on the high uncertainty level, a stepdown model may be implemented to produce a more reliable output.

In an exemplary demonstration, the methods and systems described herein may be applied to the domain of credit card fraud detection for card not present transactions. The machine learning system may involve a feed-forward artificial neural network known as a multi-layer perceptron (MLP), which will output the conditional probability of fraud given the input. The model training and test data may include tagged payment card transactions from a consortium of European financial institutions, which may be referred to as the EU data. Additionally, an out-of-sample dataset including payment card transactions from a consortium of US financial institutions, may be referred to as the US data. The base model MLP may be developed on the EU data, then to facilitate uncertainty estimation, 10 additional MLP models may be trained using a perturbed version of the base model training process. This perturbation may come from changing the MLP weight initialization and from changing the random shuffling of the data used in a variant of stochastic gradient descent, i.e., changing the random seed. The result is 11 distinct MLP models, including the original base model MLP. For a given input, each of the 11 MLP models produce a score, which can then be used to produce an uncertainty estimate based on the sample variance of the scores, which approximates the variance of the predictive distribution.

For example, a particular input variable vector from the EU test data produced the 11 scores in the table of FIG. 4A. FIG. 4A is a table of example model scores for the 11 MLP models described above, in accordance with one or more implementations.

FIG. 4B is a table of example uncertainty value quantiles for a base model and a stepdown model with respect to European Union (EU) and United States (US) sample data, in accordance with one or more implementations. As shown, the resulting uncertainty value from the EU test data is 0.0145, which may be a high uncertainty value relative to most of the transactions in the EU data. Both the score and the uncertainty value may be returned by the model to assist in the decision process, and given the higher level of uncertainty, a stepdown model may be appropriate for this particular input variable vector which represents the customer and her transaction history. More concrete information can be provided by a confidence interval and the WoE differential. A confidence interval at a 95% confidence level may be constructed using the 11 model scores by assuming a Gaussian distribution for the scores. In the example above, the sample mean of the scores is 0.747, the sample standard deviation is 0.12, and the multiplier is provided by the corresponding value of the t-distribution, which is 2.228. The resulting confidence interval is [0.479, 1.000], which may be very large and may be consistent with the high uncertainty estimate. Using a WoE look-up table, it may be possible to map the confidence interval to WoE values, which yields [2.95, 7.81]. The maximum WoE value based on the training data was 7.81 and the minimum WoE value was −2.73. Using this information, the resulting WoE differential is 46%, which is above a target threshold of 34%, so a stepdown model may be triggered. In some aspects, over 40% of the transactions result in a WoE differential of 0%, and fewer than 1% of the transactions may have as high a WoE differential as this transaction. In agreement with the high uncertainty value, the confidence interval and the WoE differential may indicate high variation in possible scores for this transaction, which again may imply that either a stepdown model is warranted or the transaction can be referred for further review before a decision is rendered.

Figure 9:
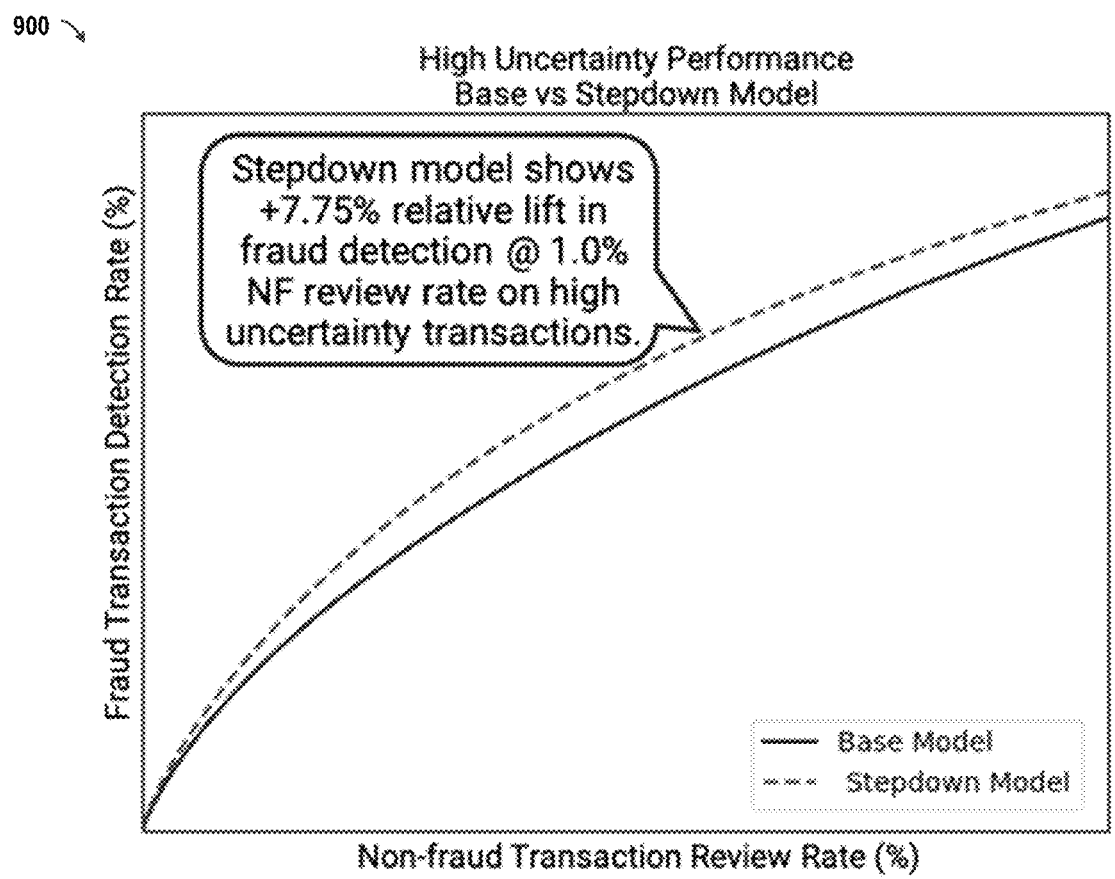
FIG. 9 is a graph illustrating a performance comparison of the base model and the stepdown model, in accordance with one or more implementations.

A stepdown model may be constructed by both finding a sparse, interpretable representation of the base model, then prohibiting unstable/uncertain feature interactions that represented noisy and potentially problematic interactions. For the particular input example mentioned in the paragraph above, the stepdown model may be used to produce a model output, which was 0.85 indicating that the stepdown model assigned high probability to the transaction being fraudulent. Further examination of the transaction and prior transaction history involved indicates that this was a very high dollar transaction both with respect to the overall population and with respect to the customer's transaction history. Additionally, since this was the customer's second such transaction with this exact dollar amount in less than a second and it was a cross border transaction it is clear that there is a strong potential of fraud, which the stepdown model identified. A more comprehensive comparison of the base model and the stepdown model on uncertain transactions was done using the US data. Analyzing the performance of the base model and the stepdown model on the US data indicates that the stepdown model produces more reliable outputs on the top 5% of uncertain transactions in the US data. This is shown in FIG. 9, which shows the receiver operating characteristic (ROC) performance for the respective models with the stepdown model showing a relative lift of +7.75% at the equivalent 1% non-fraud transaction review rate. FIG. 9 is a graph 900 illustrating a performance comparison of the base model and the stepdown model, in accordance with one or more implementations.

Given the base model described above is a 3-layer MLP, it is a high variance model that may have some weights underspecified with respect to the data, and consequently it may contain unintended or noisy feature interactions. Reducing the level of predictive variance can only help to eliminate some of these potentially problematic feature interactions. It may be possible to reduce the predictive variance by first exploding each densely connected hidden node into a sparse MLP, then measuring the level of variation within each resulting latent feature, and remove the high variation latent features, yielding a neural network with lower predictive variance.

Figure 10:
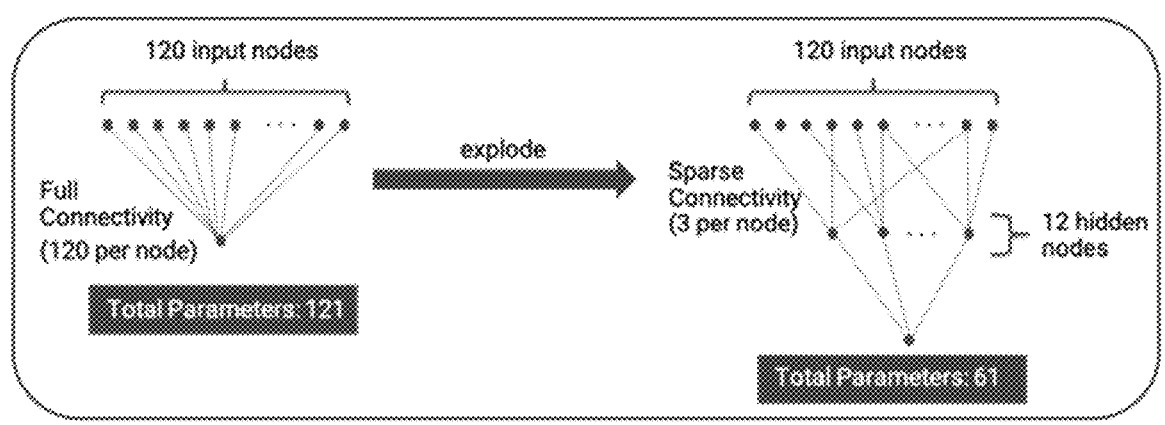
FIG. 10 is a diagram illustrating example input nodes exploded into a sparser structure, in accordance with one or more implementations.

As part of the example above, it is possible to focus on a particular hidden node in the base model neural network, which may be referred to as node A. Node A may be densely connected to every input feature, of which there are 120. Node A may be exploded into a MLP with a single hidden layer of 12 nodes with each hidden node having no more than 3 non-zero input weights. FIG. 10 is a diagram 1000 illustrating example input nodes for Node A exploded into a sparser structure, in accordance with one or more implementations.

Figure 11A:
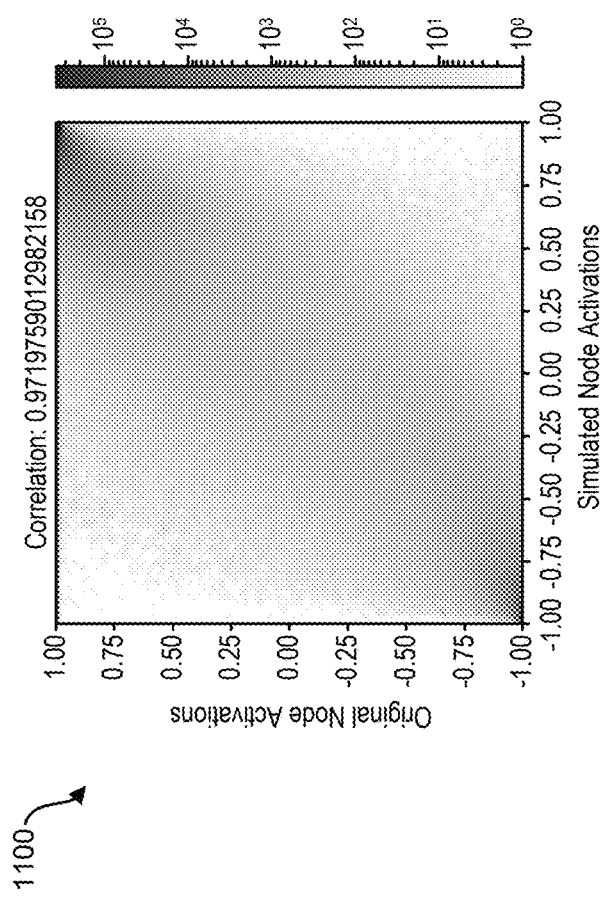
FIG. 11A is a 2D-histogram with the "exploded" node activation values on the x-axis and the original node activation values on the y-axis, illustrating a correlation between the "exploded node" and the original node, in accordance with one or more implementations.
Figure 11B:
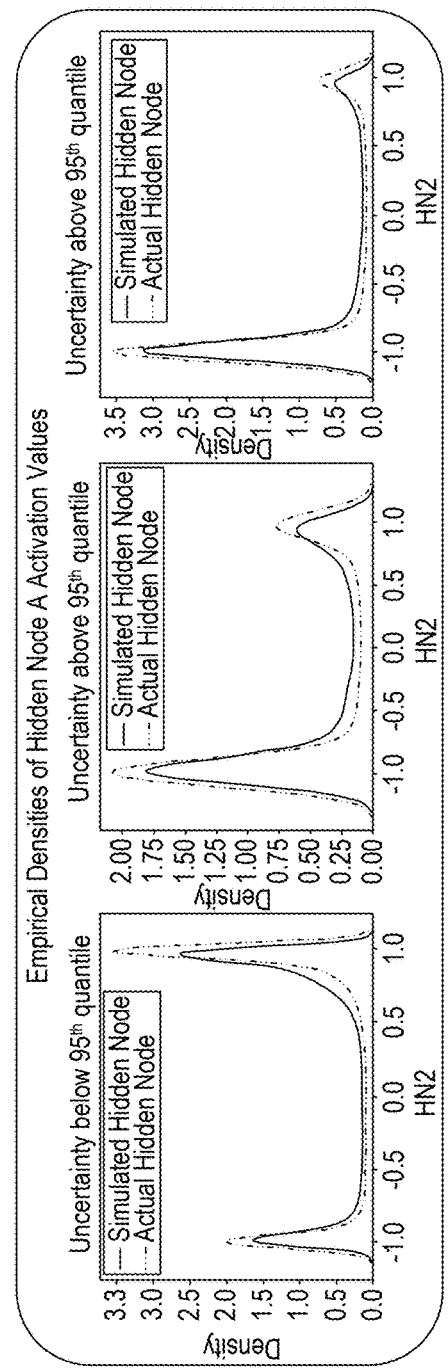
FIG. 11B illustrates example graphs of empirical densities of hidden node activation values for varying levels of uncertainty, in accordance with one or more implementations.

As shown, the exploded node is trained to mimic the output of node A by using node A's activation values as the target for each respective input in the training data. The resulting exploded node may have a Pearson correlation of 0.97 with node A based on the training data (see FIG. 11A), and additionally it shows good qualitative agreement with the original node A across varying levels of uncertainty values (see FIG. 11B). FIG. 11A is a 2D-histogram with the "exploded" node activation values on the x-axis and the original node activation values on the y-axis, illustrating a correlation between the "exploded node" and the original node, in accordance with one or more implementations. FIG. 11B illustrates example graphs of empirical densities of hidden node activation values for varying levels of uncertainty, in accordance with one or more implementations. All of this indicates that the exploded node does a reasonable job simulating the behavior of node A.

Figure 12A:
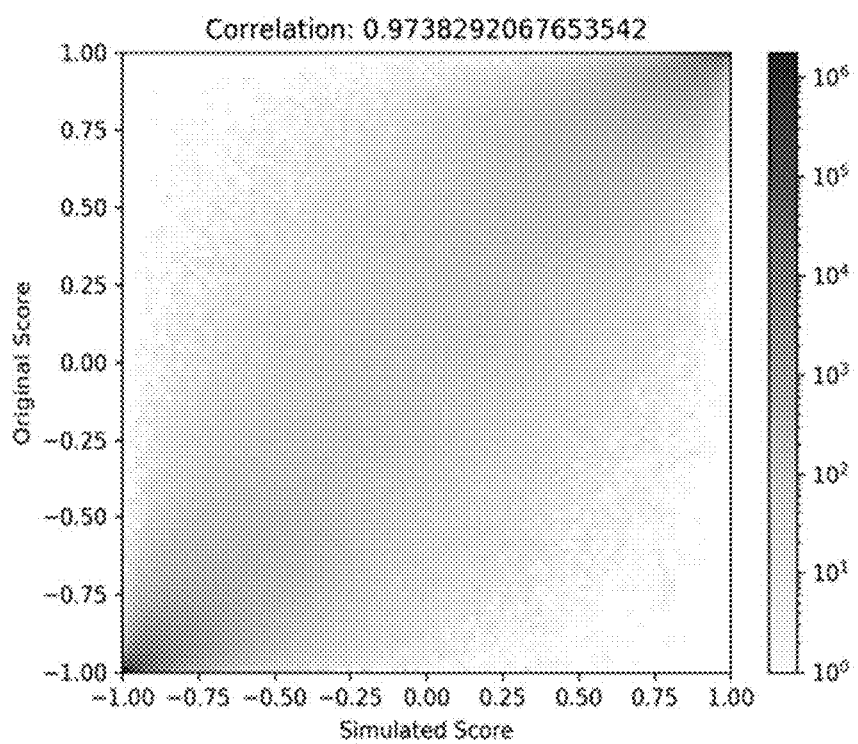
FIG. 12A is a 2D histogram of the scores from the base model (Original Score) and the exploded neural network (Simulated Score), in accordance with one or more implementations.

To construct the complete exploded sparse neural network, each of the hidden nodes in the base model may be exploded and combined using the corresponding output weights of the base model. The exploded network can then be fine-tuned for a few training epochs using the base model scores as the target, which will help to maintain similar score behavior as the base model. FIG. 12A shows a correlation of 0.97 between the scores of the base model and the scores of the sparse exploded neural network, indicating that the exploded network does a reasonable job simulating the scores of the base model. FIG. 12A is a 2D-histogram 1200 of the scores from the base model (Original Score) and the exploded neural network (Simulated Score), in accordance with one or more implementations.

Figure 12B:
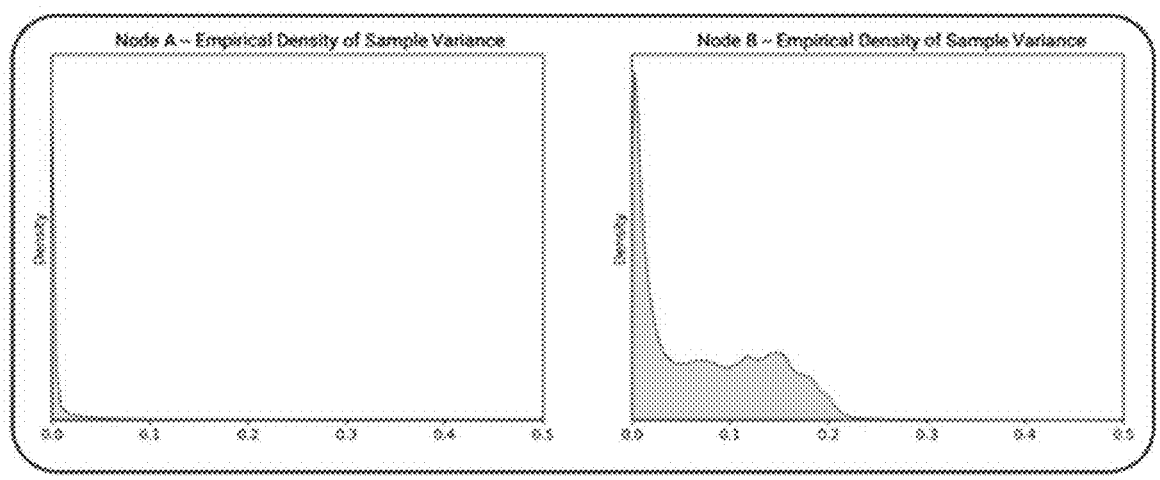
FIG. 12B illustrates example graphs of comparisons of two different nodes empirical distribution of a sample variance, in accordance with one or more implementations.

This process has created a sparser neural network that produces qualitatively similar outputs as the base model, but the ultimate goal is to take advantage of the more interpretable latent feature structure to identify latent features with higher variance in behavior, which can then be eliminated to yield a model with overall lower predictive variance. Getting a measure of variation at the latent feature level uses a similar technique as the approach to uncertainty estimation described above. The exploded neural network may be trained n+1 times using a different random seed each time while enforcing the same topology in each of the networks. The results are that a given low-level latent feature has the same input features across each of the networks, and it is possible to now look at how the interaction of those features varies across the respective latent feature in each of the trained networks. For each training input we generate n+1 activation values for each latent feature and calculate the corresponding sample variance of the latent feature in question. Then, it is possible to look at the distribution of sample variance for each latent feature and identify high variance latent features. Looking at the empirical density of sample variance for node A and a different node, node B, it may be possible to see significantly different levels of variance between the two nodes (see FIG. 12B). FIG. 12B illustrates example graphs of comparisons of two different nodes (e.g., node A and node B) empirical distribution of a sample variance, in accordance with one or more implementations.

Figures 13A, 13B:
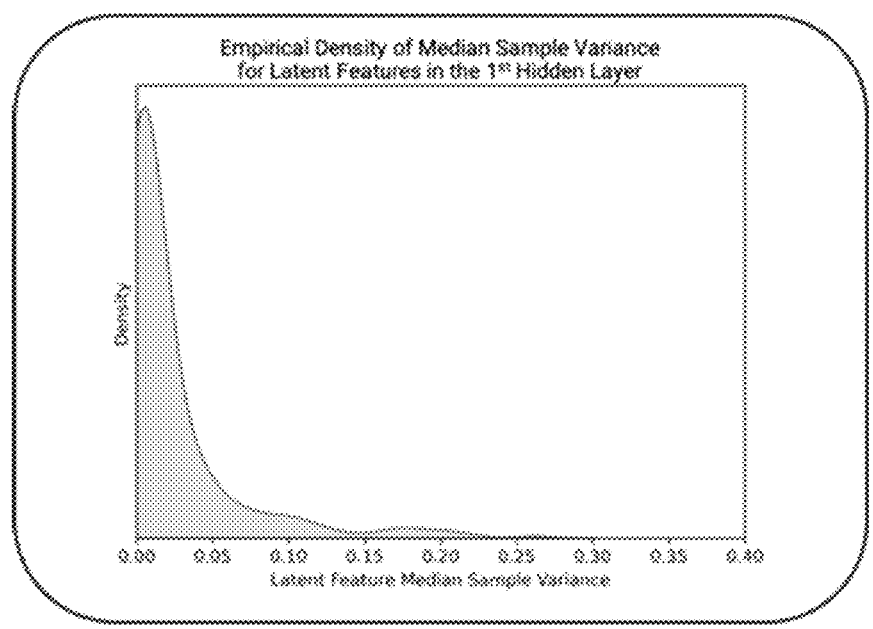
FIG. 13A is an example graph of empirical density of median sample variance for latent features in a hidden layer, in accordance with one or more implementations.
FIG. 13B is a table of example quantile values of sample predictive variance for the exploded network and a reduced exploded network.

As shown, node A and node B are in the second hidden layer of the model, but it is possible to start by removing high variance latent features in the first layer and work up through the layers. FIG. 13A shows the distribution of median sample variance of latent features in the first hidden layer of the model. The longer tail to right indicates that there are some latent features with noticeably higher variance. The top 5% of latent features in terms of median sample variance are then removed from the model, and the modeler can further manually examine the feature interactions defining the latent features in the first layer to see if there are any obviously undesirable or potentially problematic interactions occurring.

The resulting model can now be fine-tuned for a few epochs either using the true tags or the scores of the base model as the target. The process to examine latent feature sample variance can again be executed to check if there are any exceedingly high variance latent features remaining. In some aspects, removing the high variance latent features in the first layer may eliminate the occurrence of exceedingly high variance latent features in subsequent layers, so stepdown model construction may be complete. This final model may be referred to as the reduced exploded network. Follow up analysis of the model's predictive variance indicates that as expected the sample predictive variance of the reduced exploded network is significantly lower than the sample predictive variance of the initial exploded network, roughly 10x less variance and uncertainty (see FIG. 13B), providing evidence that the removal of high variance latent features led to lower predictive variance, as desired. FIG. 13B is a table 1350 of example quantile values of sample predictive variance for the exploded network and a reduced exploded network. In summary, the elimination of high variance interactions created a more reliable and robust model that exhibits lower predictive variance, as well as providing more robust performance on the population of high uncertainty transactions, with respect to the base model.

The embodiments described herein have shown that the application of uncertainty measures may enable a machine learning model not only to have a measure of uncertainty, but also to modify its behavior in the presence of highly uncertain outputs. Knowing when a machine learning model doesn't know its output with certainty may be a step to a more responsible application of machine learning systems in the decisioning process, which can both empower decision makers and help to create a more humble form of AI that is aware of its region of competency.

Figure 14:
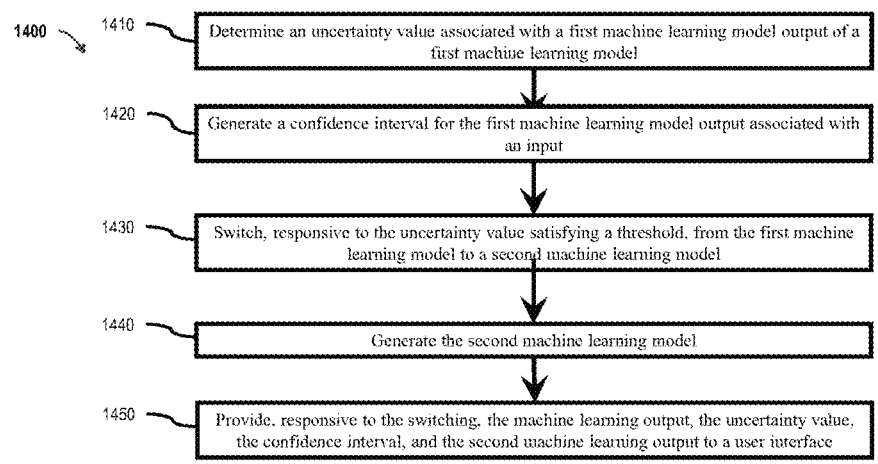
FIG. 14 is a flowchart of an example process for measuring a machine learning model uncertainty and acting accordingly.

FIG. 14 is a flowchart of an example process 1400 for measuring a machine learning model uncertainty. The process 1400 may be implemented as part of a computing system such as a decision software. Referring to FIGS. 1-15, the process 1400 may be implemented as part of a computing system such as a decision software, the computing apparatus 1500, and/or the like.

At operational block 1410, the apparatus 1500, for example, may determine an uncertainty value associated with a first machine learning model output of a first machine learning model.

For example, the uncertainty value may be based on a predictive variance of the first machine learning model (e.g., ML model 120) for a given input, which may be estimated by sampling from the posterior predictive distribution. Letting M be the model space, then training a model can be seen as a search problem to find the optimal model or parameter values, $m^* \in M$, that approximately or exactly extremize a function, F, of the training data, D, and a given model, $m^* \approx \arg \ext_{m \in M} F(m, D)$. The predictive variance may be defined as, $\mathrm{Var}(y|x) = \int [p(y|x) - p(y|x, m)]^2 \, p(m|D) dm$,
which may embody the possible variation in scores for a given input x over the possible choices of the first machine learning model. Assuming that the model space, defined by M, is sufficiently expressive to well approximate the true model, then a reasonable approximation of uncertainty for a given input x can be attained by approximating the predictive variance.

At operational block 1420, the apparatus 1500, for example, may generate a confidence interval for the first machine learning model output associated with an input. For example, the apparatus 1500 may generate the confidence interval based on a parametric statistical method or a non-parametric statistical method. In some aspects, for the parametric approach, first a desired confidence level, c, may be specified, then using the sample scores sample mean, x, sample standard deviation, s, and the appropriate parametric multiplier, $f(c)$, the confidence interval is represented as, $[\max(\bar{x} - f(c)s, 0), \min(\bar{x} + f(c)s, 1)]$, which may remain a subset of [0,1] since the score is a probability. For the non-parametric approach, the sample scores may be used to estimate specified quantiles or extrema, $q_l$ and $q_u$, which may then be used to provide an interval that represents a range of plausible values, $[q_1, q_u]$.

At operational block 1430, the apparatus 1500, for example, may switch, responsive to the uncertainty value satisfying a threshold, from the first machine learning model to a second machine learning model, the second machine learning model generating a second machine learning model output. For example, a threshold (e.g., used at comparison 330) can be specified for which any input with uncertainty value above the threshold results in the stepdown ML model (e.g., stepdown model 322) being used and a stepdown model score (e.g., stepdown model score 325) being returned in place of using the base model 120 and returning the base model score 125.

At operational block 1440, the apparatus 1500, for example, may generate the second machine learning model.

For example, the second machine learning model (e.g., stepdown model 322) may be based on the first machine learning model (e.g., base model 120). In some aspects, generating the second machine learning model includes initializing a hidden layer of the second machine learning model for hidden nodes of the first machine learning model; and training the second machine learning model to simulate the hidden nodes of the first machine learning model.

For example, a single hidden layer with sparse input-to-hidden connectivity for the second machine learning model may be initialized for each dense hidden node of the first machine learning model. Using node activation values from the previous layer as inputs and the respective dense hidden node activation values as the target, the sparse network of the second machine learning model may be trained to simulate the dense hidden node of the first machine learning model. The apparatus 1500 may identify latent features of the second machine learning model exhibiting higher levels of dispersion or variation. The latent features showing elevated levels of variation can be pruned from the graph restricting explicit feature interactions and constraining the training of the second machine learning model, resulting in a new topology and the second machine learning model. The pruned neural network (e.g., second machine learning model or stepdown model) can now be fine-tuned by training for a few epochs using either the original targets or replacing them with the output of the original dense neural network for each respective training input. The result is the second machine learning model that will exhibit lower predictive variance at the level of the model output. The second machine learning model may include a stepdown model (e.g., stepdown model 322). The stepdown model (e.g., second machine learning model) may have a lower predictive variance than the first machine learning model.

At operational block 1450, the apparatus 1500, for example, may provide, responsive to the switching, the machine learning output, the uncertainty value, the confidence interval, and the second machine learning output to a user interface. For example, the uncertainty value may indicate a level of uncertainty associated with the machine learning output. The confidence interval may indicate plausible score values (e.g., a machine learning output) for a respective model input. The second machine learning output may include a stepdown model score (e.g., stepdown model score 325). In some aspects, providing the machine learning output, the uncertainty value, the confidence interval, and the second machine learning output includes transmitting the machine learning output, the uncertainty value, the confidence interval, and the second machine learning output to a display of the user interface.

Figure 15:
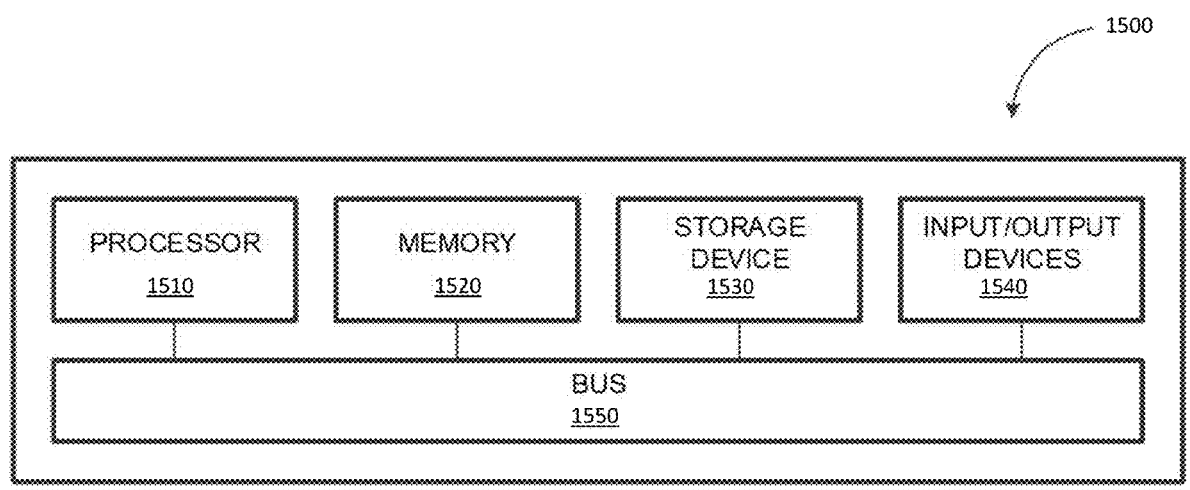
FIG. 15 depicts a block diagram illustrating a computing apparatus consistent with implementations of the current subject matter.

Referring to FIG. 15, a block diagram illustrating a computing system 1500 consistent with one or more embodiments is provided. The computing system 1500 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 15, the computing system 1500 can include a processor 1510, a memory 1520, a storage device 1530, and input/output devices 1540. The processor 1510, the memory 1520, the storage device 1530, and the input/output devices 1540 can be interconnected via a system bus 1550. The processor 1510 is capable of processing instructions for execution within the computing system 1500. Such executed instructions can implement one or more components of, for example, a cloud platform. In some implementations of the current subject matter, the processor 1510 can be a single-threaded processor. Alternately, the processor 1510 can be a multi-threaded processor. The processor 1510 is capable of processing instructions stored in the memory 1520 and/or on the storage device 1530 to display graphical information for a user interface provided via the input/output device 1540.

The memory 1520 is a computer readable medium such as volatile or non-volatile that stores information within the computing system 1500. The memory 1520 can store data structures representing configuration object databases, for example. The storage device 1530 is capable of providing persistent storage for the computing system 1500. The storage device 1530 can be a floppy disk device, a hard disk device, an optical disk device, or a tape device, or other suitable persistent storage means. The input/output device 1540 provides input/output operations for the computing system 1500. In some implementations of the current subject matter, the input/output device 1540 includes a keyboard and/or pointing device. In various implementations, the input/output device 1540 includes a display unit for displaying graphical user interfaces.

According to some implementations of the current subject matter, the input/output device 1540 can provide input/output operations for a network device. For example, the input/output device 1540 can include Ethernet ports or other networking ports to communicate with one or more wired and/or wireless networks (e.g., a local area network (LAN), a wide area network (WAN), the Internet).

In some implementations of the current subject matter, the computing system 1500 can be used to execute various interactive computer software applications that can be used for organization, analysis and/or storage of data in various (e.g., tabular) format (e.g., Microsoft Excel®, and/or any other type of software). Alternatively, the computing system 1500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1540. The user interface can be generated and presented to a user by the computing system 1500 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The owner has no objection to facsimile reproduction by any one of the patent document or the patent disclosure, as it appears in the Patent and Trademark Office patent file or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented method, the method comprising:
    determining, by one or more programmable processors, an uncertainty value associated with a first machine learning model output of a first machine learning model;
    generating, by the one or more programmable processors, a confidence interval for the first machine learning model output associated with an input;
    switching, by the one or more programmable processors and responsive to the uncertainty value satisfying a threshold, from the first machine learning model to a second machine learning model, the second machine learning model generating a second machine learning model output;
    generating, by the one or more programmable processors, the second machine learning model based on the first machine learning model; and
    providing, by the one or more programmable processors and responsive to the switching, the first machine learning output, the uncertainty value, the confidence interval, and the second machine learning output to a user interface,
        wherein generating the second machine learning model based on the first machine learning model comprises:
    constructing hidden layers of the second machine learning model where hidden nodes of the hidden layers are a sparse sub-network of hidden nodes approximating the first machine learning model;
    generating perturbed variations of sparse networks of high variance hidden nodes;
    removing or prohibiting feature interactions contributing the high variance hidden nodes; and
    iterating and training the second machine learning model based on removed and prohibited feature interactions to minimize model variance of the second machine learning model.

2. The method of claim 1, wherein the uncertainty value is based on an estimate of model predictive variance for the first machine learning model based on an ensemble of architecturally same machine learning models based on a sampling of models based on different training parameters.

3. The method of claim 2, wherein the model predictive variance for the first machine learning model is based on variance of a finite sum of possible choices of the first machine learning model from a posterior distribution.

4. The method of claim 1, wherein the confidence interval is based on a parametric statistical method or a non-parametric statistical method.

5. The method of claim 1, wherein the confidence interval is represented as $[\max(\bar{x}-f(c)s,0), \min(\bar{x}+f(c)s,1)]$, where c is a desired confidence level, $\bar{x}$ represents sample scores sample mean, s represents sample standard deviation, and $f(c)$ represents an appropriate parametric multiplier.

6. The method of claim 1, wherein the second machine learning model comprises a stepdown model.

7. The method of claim 6, wherein the stepdown model has a lower predictive variance than the first machine learning model.

8. The method of claim 2, wherein the predictive variance is defined as a possible variation in scores for a given input x over possible choices of the first machine learning model.

9. The method of claim 1, wherein providing the machine learning output, the uncertainty value, the confidence interval, and the second machine learning output comprises transmitting the machine learning output, the uncertainty value, the confidence interval, and the second machine learning output to a display of the user interface.

10. A system comprising:
    at least one programmable processor; and
    a non-transitory machine-readable medium storing instructions that, when executed by the at least one programmable processor, cause the at least one programmable processor to perform operations comprising:
    determining an uncertainty value associated with a first machine learning model output of a first machine learning model;
    generating a confidence interval for the first machine learning model output associated with an input;
    switching, responsive to the uncertainty value satisfying a threshold, from the first machine learning model to a second machine learning model, the second machine learning model generating a second machine learning model output;
    and
    providing, responsive to the switching, the first machine learning output, the uncertainty value, the confidence interval, and the second machine learning output to a user interface,
    generating the second machine learning model based on the first machine learning model by:
        constructing hidden layers of the second machine learning model where hidden nodes of the hidden layers are a sparse sub-network of hidden nodes approximating the first machine learning model;
        generating perturbed variations of sparse networks of high variance hidden nodes;
        removing or prohibiting feature interactions contributing the high variance hidden nodes; and iterating and training the second machine learning model based on removed or prohibited feature interactions to minimize model variance of the second machine learning model.

11. The system of claim 10, wherein the uncertainty value is based on an estimate of model predictive variance for the first machine learning model.

12. The system of claim 10, wherein the confidence interval is based on a parametric statistical method or a non-parametric statistical method.

13. The system of claim 10, wherein the confidence interval is represented as $$[\max(\bar{x} - f(c)s, 0), \min(\bar{x} + f(c)s, 1)],$$

where c is a desired confidence level, $\bar{x}$ represents sample scores sample mean, s represents sample standard deviation, and $f(c)$ represents an appropriate parametric multiplier.

14. The system of claim 10, wherein the second machine learning model comprises a stepdown model.

15. The system of claim 14, wherein the stepdown model has a lower predictive variance than the first machine learning model.

16. The system of claim 10, wherein the predictive variance is defined as a possible variation in scores for a given input x over possible choices of the first machine learning model.

\* \* \* \* \*